United States Patent
Bottari et al.

(10) Patent No.: US 10,419,148 B2
(45) Date of Patent: Sep. 17, 2019

(54) OPTICAL NODE

(71) Applicant: Telefonaktiebolaget LM Ericsson (publ), Stockholm (SE)

(72) Inventors: Giulio Bottari, Pisa (IT); Fabio Cavaliere, Pisa (IT); Francesco Testa, Pisa (IT)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 21 days.

(21) Appl. No.: 15/511,265

(22) PCT Filed: Sep. 24, 2014

(86) PCT No.: PCT/EP2014/070309
§ 371 (c)(1),
(2) Date: Mar. 15, 2017

(87) PCT Pub. No.: WO2016/045716
PCT Pub. Date: Mar. 31, 2016

(65) Prior Publication Data
US 2018/0234200 A1 Aug. 16, 2018

(51) Int. Cl.
*H04J 14/02* (2006.01)
*H04Q 11/00* (2006.01)

(52) U.S. Cl.
CPC ...... *H04J 14/0212* (2013.01); *H04J 14/0204* (2013.01); *H04J 14/0205* (2013.01); *H04Q 11/0005* (2013.01); *H04Q 2011/0016* (2013.01)

(58) Field of Classification Search
CPC ................................................ H04J 14/0212
See application file for complete search history.

(56) References Cited

U.S. PATENT DOCUMENTS 6,771,905 B1 8/2004 Bortz
2008/0063397 A1* 3/2008 Hu .................. H04J 14/0282
398/43

(Continued)

FOREIGN PATENT DOCUMENTS

EP 1162855 A1 12/2001
JP 2005168027 A 6/2005

(Continued)

OTHER PUBLICATIONS

Sabella, Roberto et al., "Trends in Optical Transport Networks and Related Technologies", 2014 16th International Conference on Transparent Optical Networks (ICTON), IEEE, Jul. 6-10, 2014, 1-4.

(Continued)

*Primary Examiner* — Nathan M Cors
(74) *Attorney, Agent, or Firm* — Patent Portfolio Builders, PLLC (57) ABSTRACT

An optical node (100) is disclosed. The optical node (100) comprises first and second line ports (104, 106) for Wavelength Division Multiplexing (WDM) signals and first and second pluralities of local add/drop ports (108, 110) for optical signals. The optical node further comprises a wavelength selective switch (112), coupled between the first and second line ports (104, 106) and configured to drop optical signals from a WDM signal traversing the optical node between the first and second line ports (104, 106), and a node optical combiner (114) coupled between the first and second line ports (104, 106) and configured to add optical signals to a WDM signal traversing the optical node between the first and second line ports (104, 106). The optical node also comprises first and second switching units (116, 118), each switching unit coupled to the wavelength selective switch (112), the node optical combiner (114), a respective one of the first and second pluralities of local add/drop ports (108, 110) and the other of the first and second switching (Continued)

units (116, 118). Each of the first and second switching units (116, 118) is configured to distribute dropped optical signals from the wavelength selective switch (112) to its coupled plurality of local add/drop ports and to provide optical signals from its coupled plurality of local add/drop ports to the node optical combiner (114). Each of the first and second switching units (116, 118) is also configured to distribute optical signals from its coupled plurality of local add/drop ports to the other of the first and second switching units (116, 118) and to distribute optical signals from the other of the first and second switching units to its coupled plurality of local add/drop ports.

21 Claims, 8 Drawing Sheets

(56) References Cited

U.S. PATENT DOCUMENTS

2009/0232492 A1* 9/2009 Blair ................... H04J 14/0206
395/5
2013/0136068 A1 5/2013 Johansson et al.
2013/0259474 A1* 10/2013 Ji ....................... H04J 14/0212
398/48
2014/0161454 A1 6/2014 Roorda

FOREIGN PATENT DOCUMENTS

WO 2013063543 A1 5/2013
WO 2016005008 A1 1/2016

OTHER PUBLICATIONS

Watanabe, Toshio et al., "Multicast Switch Technology that Enhances ROADM Operability", Feature Articles: Optical Node and Switch Technologies for Implementing Flexible and Economical Networks, NTT Technical Review, vol. 12, No. 1, Jan. 2014, 1-5.
English translation of first office action issued in Application No. 201480082214.6, dated Jan. 29, 2018, 2 Pages.
English translation of second office action issued in Application No. 201480082214.6, dated Nov. 2, 2018, 1 Page.

* cited by examiner

Figure 10

OPTICAL NODE

TECHNICAL FIELD

The present invention relates to an optical node and particularly but not exclusively to an optical node which may form part of a fronthaul network connecting Radio Equipment with Radio Equipment Controllers in a communication network.

BACKGROUND

In cellular communication networks, radio basestations (RBS) provide radio network coverage over a coverage area or cell. In some implementations, radio basestations may be separated into one or more radio units and one or more baseband processing units, enabling, among other advantages, the optimising of radio unit placement. The radio units may be referred to as Remote Radio Units (RRUs) or as Radio Equipments (REs). The baseband processing units may be referred to as Digital Units (DUs), Baseband Units (BBUs) or as Radio Equipment Controllers (RECs). The Common Public Radio Interface (CPRI) specifies an internal interface protocol for RBS communication between REs and RECs.

Growing demand for cellular network data access has imposed increasing requirements upon the communication links between REs and RECs. For example, Long Term Evolution Time Division Duplexing (LTE-TDD) with 20 MHz bandwidth and eight receive antennas requires CPRI communication links between REs and RECs operating at 10 Gbit/s. Supporting such high speed signals with traditional electrical techniques is impractical, owing to realisation complexity, increased power consumption, cable costs and footprint. In addition, many RBS installations are implemented with a Main-Remote architecture, in which RE and REC are separated by a distance of up to a few kilometers. Optical fibres offer the possibility of transmitting high speed signals with very low loss, and consequently optical interconnection has proven the most viable technology for RBS communication between RE and REC.

Recent RBS development has focussed on the centralisation of baseband processing for RBSs. Centralised baseband processing offers efficiencies in the exploitation of computational resources as well as facilitating close coordination between cells covering the same or overlapping geographical areas. In a typical heterogeneous network deployment, a macro cell may be complemented with a set of coordinated small cells. Coordination among the set of small cells allows for spectrum sharing and reuse through the avoidance of interference, especially at cell borders.

In a centralised baseband processing deployment, multiple antenna sites host clusters of REs, which REs are connected with at least one pool of RECs, where baseband processing is performed. The communication links between REs and RECs in such deployments are collectively referred to as the fronthaul network. Optical networking based on Dense Wavelength Division Multiplexing (DWDM) is perceived as the ideal technology to serve the fronthaul network, owing to its capability to ensure high bandwidth, low latency, long reach, high fibre utilisation and high levels of resiliency.

In a typical Main-Remote architecture, each cluster of REs is connected to an REC in a one to one association via point to point connections. A significant increase of the processing optimisation could be achieved by moving to a more evolved networking scenario in which a pool of RECs could serve a large group of REs, which may thus be distributed over a wider geographical area. Such scenarios would allow for a greater optimisation of computational resources and for the inclusion a larger number of cells in a common area. In future evolutions of cellular network development, it is expected that baseband processing centralisation will be developed still further, with the concentration of RECs into a few specialised locations such as data centres. This development will require transport and switching solutions able to carry radio traffic across much larger distances.

Existing optical networking solutions for fronthaul networks offer transport over a distance of 10 to 15 km between REs and RECs. These existing solutions are based on Optical-Electro-Optical (OEO) conversion, with electrical switching at a hub node. Such solutions offer a high degree of scalability, owing to the reuse of wavelengths and to electrical switching, and a high degree of flexibility provided by sub-wavelength grooming. However the equipment in the hub node is not transparent to bit rates or to protocols. This lack of transparency means that future network evolution, which may be accompanied by the development of new transport and interface protocols, may require hardware replacement or reconfiguration in the fronthaul network. In addition, the extra power requirements for OEO conversion and CPRI switching increase the operating cost of such existing optical networking solutions.

SUMMARY

It is an aim of the present invention to provide an optical node, a network segment and a method for managing a network segment which obviate or reduce at least one or more of the disadvantages mentioned above.

According to a first aspect of the present invention, there is provided an optical node. The optical node comprises first and second line ports for Wavelength Division Multiplexing (WDM) signals, first and second pluralities of local add/drop ports for optical signals, a wavelength selective switch coupled between the first and second line ports and configured to drop optical signals from a WDM signal traversing the optical node between the first and second line ports, and a node optical combiner coupled between the first and second line ports and configured to add optical signals to a WDM signal traversing the optical node between the first and second line ports. The optical node further comprises first and second switching units, each switching unit coupled to the wavelength selective switch, the node optical combiner, a respective one of the first and second pluralities of local add/drop ports and the other of the first and second switching units. Each of the first and second switching units is configured to distribute dropped optical signals from the wavelength selective switch to its coupled plurality of local add/drop ports and to provide optical signals from its coupled plurality of local add/drop ports to the node optical combiner. Each of the first and second switching units is also configured to distribute optical signals from its coupled plurality of local add/drop ports to the other of the first and second switching units and to distribute optical signals from the other of the first and second switching units to its coupled plurality of local add/drop ports.

An optical node according to an aspect of the present invention thus provides both internal and external bypass functionality, in addition to add/drop functionality.

According to embodiments of the invention, the first plurality of local add/drop ports may be equal in number to the second plurality of local add/drop ports.

According to embodiments of the invention, each local add/drop port in the first and second pluralities of the local add/drop ports may be operable for connection to a pair of unidirectional optical fibres, each fibre hosting a single wavelength.

According to embodiments of the invention, each of the first and second switching units may comprise a receive switching device and a transmit switching device.

According to embodiments of the invention, the receive and transmit switching devices of each switching unit may comprise split and select switches (SSSs).

According to embodiments of the invention, the receive switching device of each switching unit may comprise a local connectivity WDM signal input coupled to an output of the transmit switching device of the other switching unit, a remote connectivity WDM signal input coupled to an output of the wavelength selective switch, and a plurality of optical signal outputs, each optical signal output coupled to a drop output of a respective one of the plurality of local add/drop ports to which the switching unit of the receive switch is coupled.

According to embodiments of the invention, the receive switching device of each switching unit may further comprise a local connectivity splitter, arranged to receive a WDM signal from the local connectivity WDM signal input of the receive switching device, and a remote connectivity splitter, arranged to receive a WDM signal from the remote connectivity WDM signal input of the receive switching device. The receive switching device of each switching unit may further comprise a plurality of optical switches and a plurality of optical tunable filters, each optical tunable filter coupled between an output of a respective optical switch and a respective one of the optical signal outputs of the receive switching device. Each of the local connectivity splitter and the remote connectivity splitter may be configured to duplicate its received WDM signal and to send a duplicate of the received WDM signal to an input of each of the plurality of optical switches. Each of the plurality of optical switches may be configured to select which of the received duplicate WDM signals to transmit, and each of the tunable optical filters may be configured to extract a wavelength from the transmitted WDM signal corresponding to the optical signal output of the receive switching device to which it is coupled.

According to embodiments of the invention, each of the plurality of optical switches may be configured to select which of the received duplicate WDM signals to transmit on the basis of a received control signal.

According to embodiments of the invention, each of the tunable optical filters may be configured to extract a wavelength from the transmitted WDM signal corresponding to the optical signal output of the receive switching device to which it is coupled on the basis of a received control signal.

According to embodiments of the invention, the transmit switching device of each switching unit may comprise a plurality of optical signal inputs, each input coupled to an add input of a respective one of the plurality of local add/drop ports to which the switching unit of the transmit switch is coupled, a local connectivity WDM signal output coupled to an input of the receive switching device of the other switching unit, and a remote connectivity WDM signal output coupled to an input of the optical combiner.

According to embodiments of the invention, the transmit switching device of each switching unit may further comprise a local connectivity optical combiner, arranged to deliver a WDM signal to the local connectivity WDM signal output of the transmit switching device, a remote connectivity optical combiner, arranged to deliver a WDM signal to the remote connectivity WDM signal output of the transmit switching device, and a plurality of optical switches, each optical switch arranged to receive an optical signal from a respective one of the optical signal inputs of the transmit switching device. Each of the plurality of optical switches may be configured to transmit an optical signal received from its respective optical signal input to at least one of the local connectivity or remote connectivity optical combiners. The local connectivity optical combiner may be configured to multiplex optical signals received from the plurality of optical switches into a WDM signal and to deliver the WDM signal to the local connectivity WDM signal output of the transmit switching device. The remote connectivity optical combiner may be configured to multiplex optical signals received from the plurality of optical switches into a WDM signal and to deliver the WDM signal to the remote connectivity WDM signal output of the transmit switching device.

According to embodiments of the invention, each of the plurality of optical switches may be configured to select an optical combiner to transmit its received optical signal to on the basis of a received control signal.

According to embodiments of the invention, the transmit switching device of at least one of the first or second switching units may further comprise an internal switching unit output, which may be coupled to an internal switching unit input of the receive switch of the at least one of the first or second switching units.

According to embodiments of the invention, the optical node may further comprise a local connectivity amplification stage, coupled between the first and second switching units, and a remote connectivity amplification stage, coupled between the first and second line ports. According to examples of the invention, the local connectivity and remote connectivity amplification stages may offer the possibility of tailored amplification for local and remote traffic, thus enabling increased amplification for remote traffic and hence enlarging the coverage area of a system or architecture incorporating the optical node.

According to embodiments of the invention, the local connectivity amplification stage may comprise a first local connectivity amplifier, arranged to amplify a WDM signal from the local connectivity WDM signal output of the transmit switching device of the first switching unit, and a second local connectivity amplifier, arranged to amplify a WDM signal from the local connectivity WDM signal output of the transmit switching device of the second switching unit.

According to embodiments of the invention, the remote connectivity amplification stage may comprise a first remote connectivity amplifier, arranged to amplify a WDM signal for input to the wavelength selective switch, and a second remote connectivity amplifier arranged to amplify a WDM signal from the node optical combiner.

According to another aspect of the present invention, there is provided a network sub-segment comprising an optical node according to the first aspect of the present invention, a plurality of Radio Equipment (RE) clusters, each RE cluster connected to a local add/drop port of the first plurality of local add/drop ports of the optical node, and a plurality of Radio Equipment Controllers (RECs), the plurality of RECs connected to the second plurality of local add/drop ports of the optical node.

According to embodiments of the invention, each RE cluster may be connected to its respective local add/drop port on the optical node by a pair of unidirectional optical fibres.

According to embodiments of the invention, each REC may be connected to a number of local add/drop ports in the second plurality of local add/drop ports that corresponds to the number of RE clusters divided by the number of RECs.

According to embodiments of the invention, each local add/drop port of the second plurality of local add drop ports on the optical node may be connected to an REC by a pair of unidirectional optical fibres.

According to another aspect of the present invention, there is provided a network segment comprising a plurality of network sub-segments according to the second aspect of the present invention and an optical infrastructure, wherein the optical infrastructure is coupled to the first and second line ports of the optical nodes of the network sub-segments.

According to embodiments of the invention, the optical infrastructure may comprise a pair of unidirectional optical fibre rings, each network sub-segment being mounted on each ring via a line input and a line output at each of the first and second line ports on its optical node.

According to embodiments of the invention, the optical node of each network sub-segment may further comprise third and fourth line ports for WDM signals, and the optical infrastructure may comprises an optical fibre mesh, each network sub-segment being connected to the mesh via a line input and a line output at each of the first, second, third and fourth line ports on its optical node.

According to embodiments of the invention, the network segment may comprise a fronthaul network segment for a Radio Access Network (RAN) of a cellular communications network.

According to another aspect of the present invention, there is provided a method for managing a network segment according to the third aspect of the present invention, the method comprising routing baseband processing traffic from RE clusters in a network sub-segment of the network segment to RECs in the network sub-segment via the optical node of the network sub-segment. The method further comprises, on detecting baseband processing traffic in the network sub-segment below a first threshold level, consolidating the baseband processing traffic of the network sub-segment amongst a subset of the RECs in the network sub-segment, and transitioning the remaining RECs of the network sub-segment to a low power state. The method further comprises, on detecting baseband processing traffic in the network sub-segment above an second threshold level, transitioning at least one of the remaining RECs of the network sub-segment back to a normal power state and distributing the baseband processing traffic of the network sub-segment amongst the subset of RECs and the transitioned at least one of the remaining RECs.

According to embodiments of the invention, detecting baseband processing traffic above or below threshold levels may comprises one or more of monitoring traffic within the network sub-segment, monitoring the processing load of RECs within the network sub-segment, or monitoring traffic trends within the network sub-segment.

According to embodiments of the invention, the method may further comprise detecting that at least one of the RECs in the network sub-segment is experiencing reduced functionality, and routing baseband processing traffic from RE clusters in the network sub-segment that would otherwise be processed by the REC experiencing reduced functionality to at least one REC in another network sub-segment of the network segment, the baseband processing traffic being routed via the optical node of the network sub-segment, the optical infrastructure and the optical node of the other network sub-segment. Reduced functionality may be caused by a fault or malfunction within an REC, a scheduled maintenance or upgrade of an RAC or any other scheduled or unscheduled interruption of functionality.

According to another aspect of the present invention, there is provided a computer program product configured, when run on a computer, to execute a method according to the fourth aspect of the present invention.

According to another aspect of the resent invention, there is provided a system in a Remote Access Network (RAN) of a cellular communications network, the system comprising a first plurality of RE clusters and a first plurality of RECs connected by a first optical hub, a second plurality of RE clusters and a second plurality of RECs connected by a second optical hub, and an optical infrastructure connecting the first optical hub with the second optical hub. Each of the first and second optical hubs is configured to transmit signals from any of its connected RE clusters to any of its connected RECs, and to transmit signals from any of its connected RE clusters to the other optical hub, for delivery to any of the RECs connected to the other optical hub.

According to embodiments of the invention, the first and second optical hubs may comprise optical nodes according to the first aspect of the present invention, the first plurality of RE clusters, first plurality of RECs and first optical hub may comprise a network sub-segment according to the second aspect of the present invention, and the second plurality of RE clusters, second plurality of RECs and second optical hub may comprise a network sub-segment according to the first aspect of the present invention.

According to another aspect of the present invention, there is provided an optical node comprising first and second line ports for Wavelength Division Multiplexing (WDM) signals, first and second pluralities of local add/drop ports for optical signals, and control switching circuitry. The control switching circuitry is configured to provide add/drop functionality for optical signals between the first and second pluralities of local add/drop ports and the first and second line ports, external bypass functionality between the first and second line ports, and internal bypass functionality between the first and second pluralities of local add/drop ports.

BRIEF DESCRIPTION OF THE DRAWINGS

For a better understanding of the present invention, and to show more clearly how it may be carried into effect, reference will now be made, by way of example, to the following drawings in which.

DETAILED DESCRIPTION

Aspects of the present invention provide an optical node suitable for use in a Radio Access Network (RAN), and particularly in the fronthaul network section of a RAN. One example of a conventional optical node is a two way Reconfigurable Optical Add Drop Multiplexer (ROADM). Optical nodes according to aspects of the present invention evolve the connectivity characteristics of known ROADMs, enabling communication between RE clusters, or pools of RE clusters, and pools of RECs, over both local and remote distance scales. This communication is facilitated by the enabling of both internal and external bypass functionality within the optical node, in addition to add/drop functionality.

Figure 1:
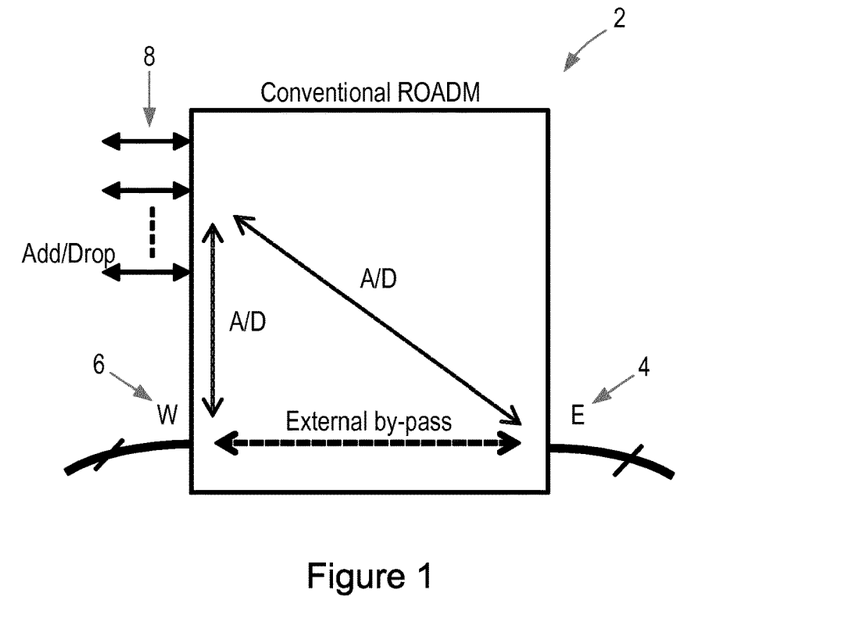
FIG. 1 illustrates a known optical node.

FIG. 1 is a schematic illustration of a known ROADM 2. The ROADM 2 comprises first and second line ports 4, 6, suitable for optical Wavelength Division Multiplexing (WDM) signals. The ROADM 2 also comprises a plurality of local Add/Drop ports 8, suitable for optical signals. Each local Add/Drop port may be operable for connection to another entity via a pair of unidirectional optical fibres. Optical signals may be locally added to, or dropped from, a WDM flow to either of the two line ports 4, 6, labelled in FIG. 1 as an East line port 4 and a West line port 6. In addition, external bypass of optical signals which do not originate or terminate at the ROADM 2 is facilitated, via direct flow between the two line ports 4, 6.

Figure 2:
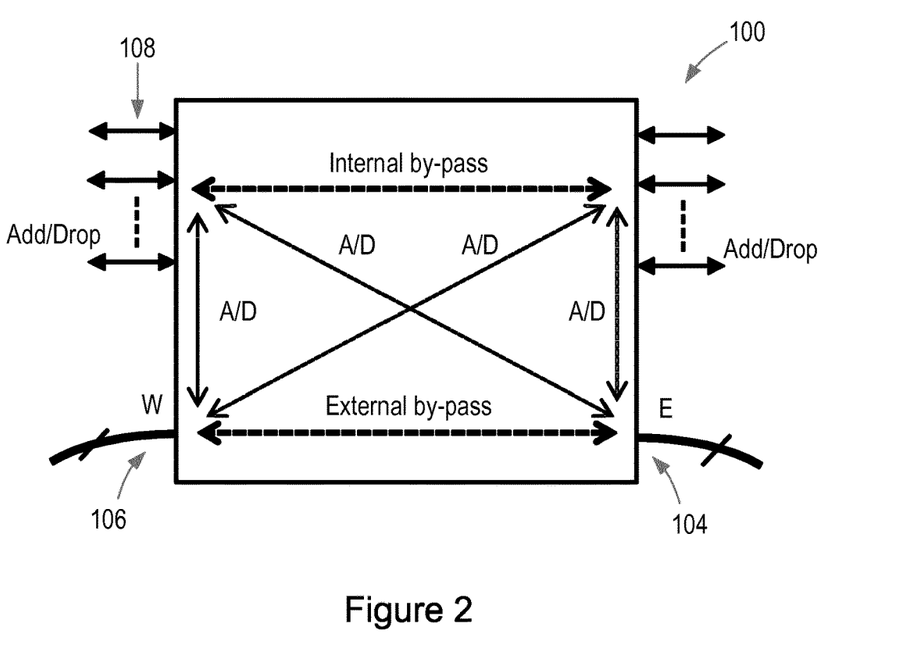
FIG. 2 illustrates an optical node according to an example of the present invention.

FIG. 2 is a schematic illustration of an optical node 100 according to an example of the present invention. The optical node 100 comprises first and second line ports 104, 106, suitable for optical WDM signals, and first and second pluralities of local Add/Drop ports 108, 110, suitable for optical signals. Each local Add/Drop port of the first and second pluralities of local Add/Drop ports 108, 110 may be operable for connection to another entity via a pair of unidirectional optical fibres. Optical signals may be locally added to, or dropped from, a WDM flow to either of the two line ports 104, 106, labelled in FIG. 2 as an East line port 104 and a West line port 106. External bypass of optical signals which do not originate or terminate at the node 100 is enabled. In addition, internal bypass of optical signals between the first and second pluralities of local Add/Drop ports 108, 110 is also facilitated. The structure of the optical node 100 is such that the internal bypass functionality is both non-blocking and contentionless, allowing consolidation amongst elements and simultaneous use of the same frequency in local and remote communication. The internal structure of the optical node 100 is discussed in further detail below with reference to FIGS. 4, 5 and 6.

Figure 3:
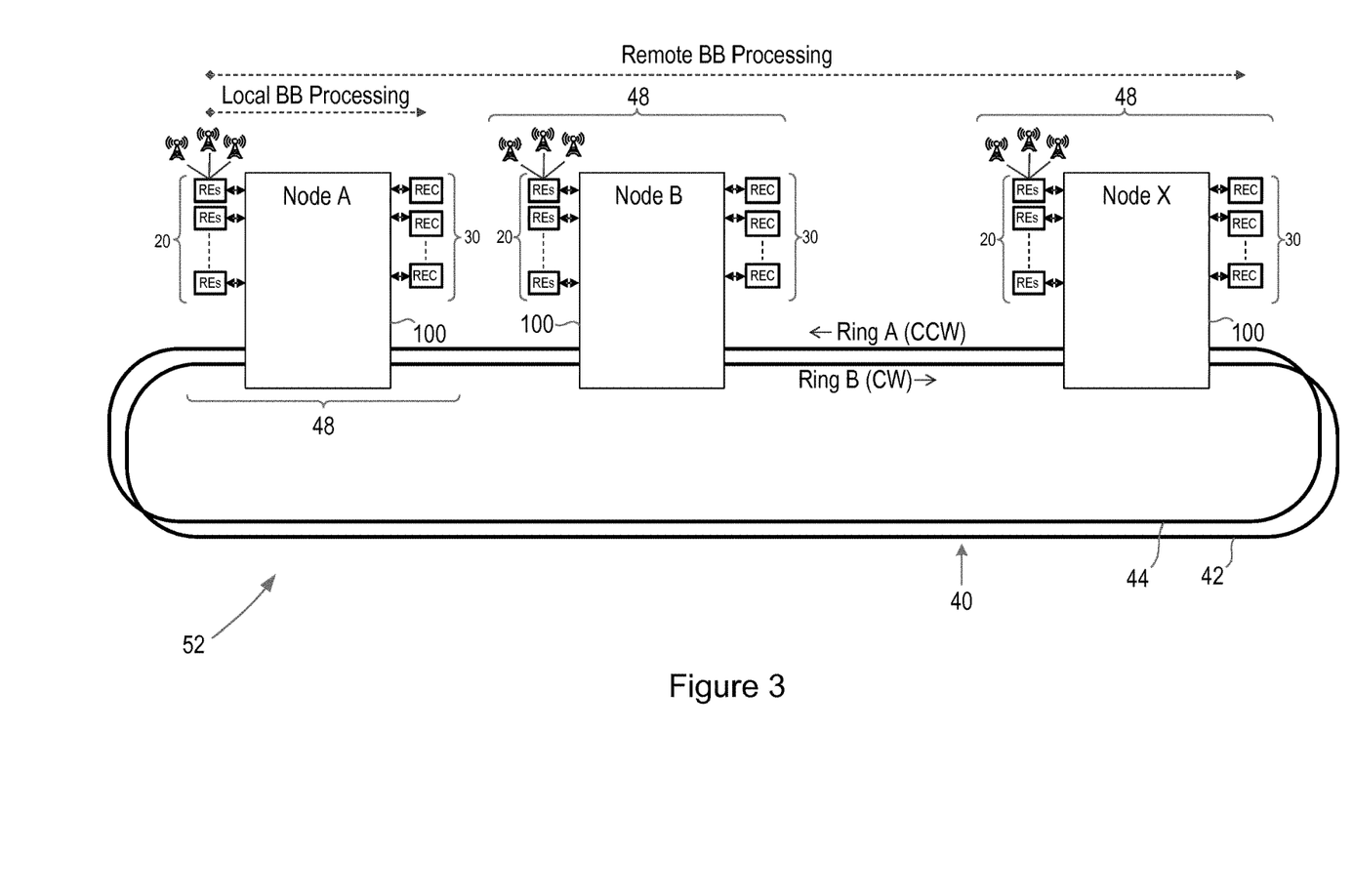
FIG. 3 illustrates a network segment of a communication network.

FIG. 3 is a schematic representation of a fronthaul network segment 52, illustrating an example deployment application for the optical node 100. Referring to FIG. 3, X optical nodes 100 are connected via an optical infrastructure 40. The optical infrastructure 40 comprises a pair of unidirectional optical rings, including a counter clockwise ring 44 (Ring A) and a clockwise ring 42 (Ring B). Other optical infrastructures 40 such as an optical mesh may be envisaged, as discussed in further detail below. Each optical node 100 is connected to a plurality of local RE clusters 20, via its first plurality of local Add/Drop ports 108, and to a plurality of local RECs 30, via its second plurality of local Add/Drop ports 110. Each optical node together with its connected pluralities of local RE clusters 20 and local RECs 30 forms a network sub-segment 48 within the larger network segment 52.

Each optical node 100 serves at least three separate functions within the network segment 52. Each optical node 100 optically interconnects its associated plurality of local RE clusters 20 with its associated plurality of local RECs 30 via its internal bypass functionality. This allows for local baseband processing with the optical node acting as a local optical hub. In addition, each optical node 100 also optically interconnects is associated plurality of local RE clusters 20 with one or more RECs associated with other optical nodes on the optical infrastructure 40, via its Add/Drop functionality. This allows for remote baseband processing involving two or more optical nodes within the network segment 52. Each optical node also acts as transparent bypass for optical signals that neither originate with nor terminate at the optical node.

In one example operation of the network segment 52, traffic originating in a macro cell connected to a first optical node 100A may be baseband processed by an REC directly connected to the first optical node 100A (local baseband processing), or may be sent via the optical rings 42, 44, to an REC directly connected to another optical node 100X (remote baseband processing).

Figure 4:
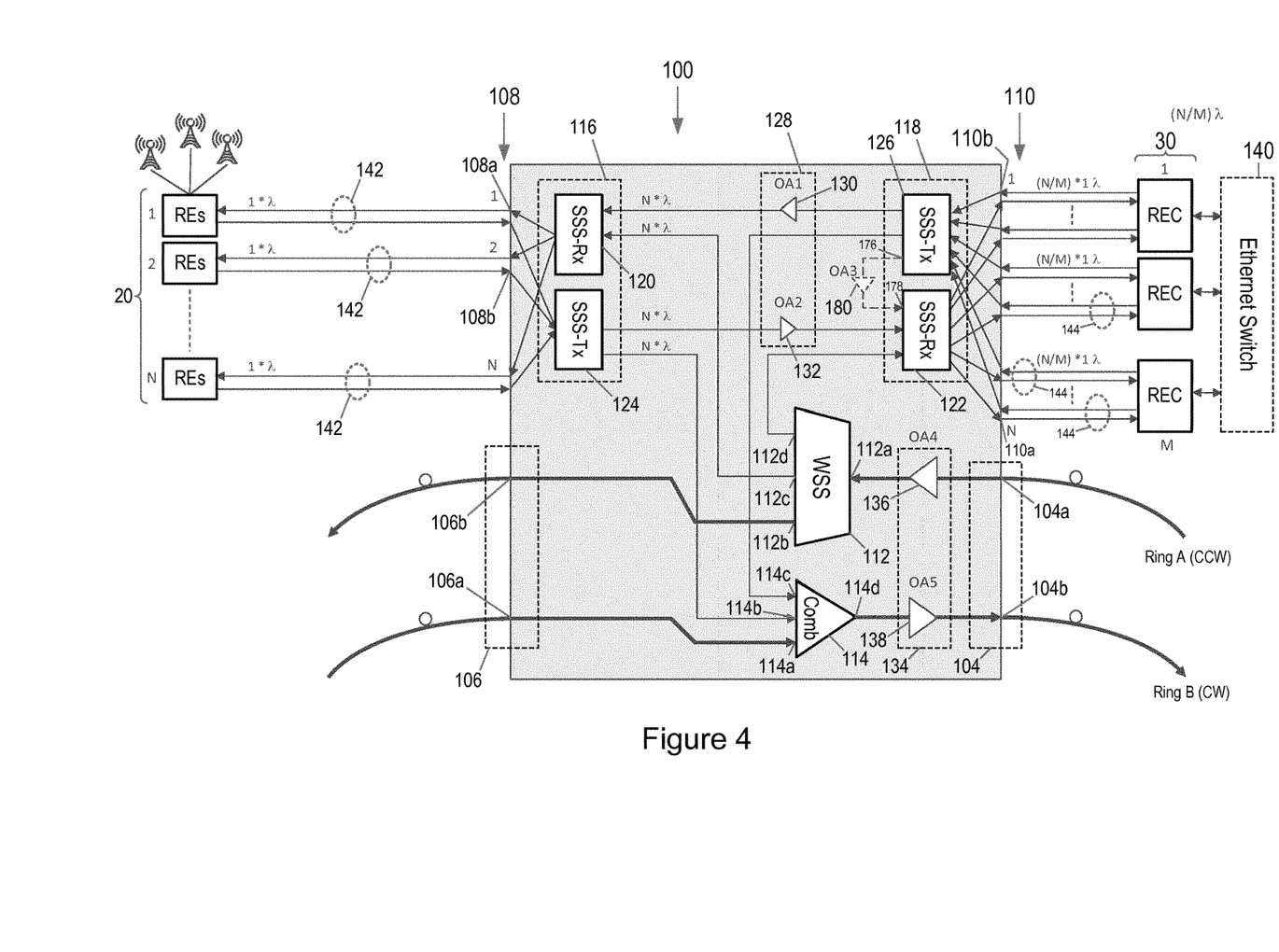
FIG. 4 illustrates additional detail of an optical node according to FIG. 2.
Figure 5:
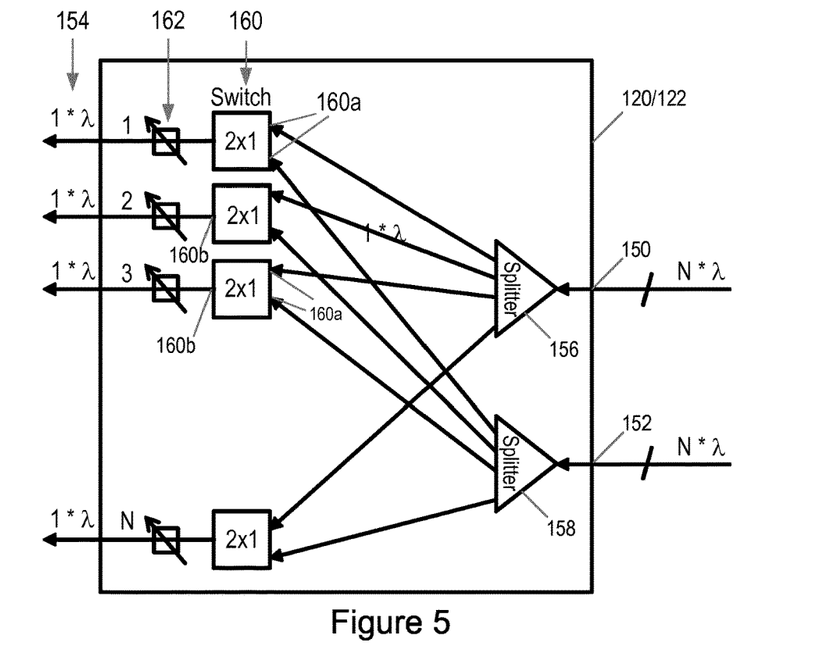
FIG. 5 illustrates a receive switching device.
Figure 6:
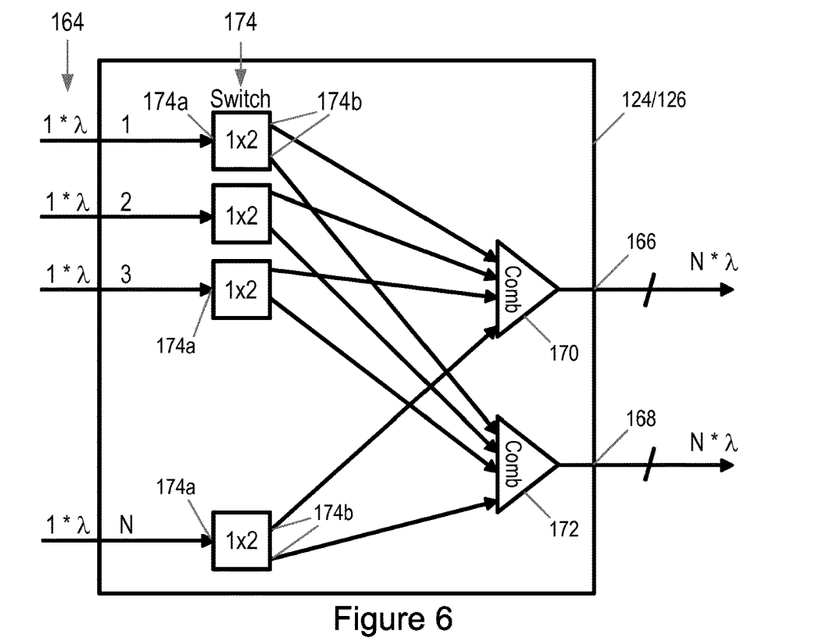
FIG. 6 illustrates a transmit switching device.

FIG. 4 illustrates the internal architecture of the optical node 100, with additional component detail shown in FIGS. 5 and 6. Referring to FIG. 4, a plurality of N RE clusters 20 is connected to the first plurality of N local Add/Drop ports 108 of the node 100. Each RE cluster is connected to a local Add/Drop port via a pair of unidirectional fibres 142, each fibre hosting a single wavelength ($\lambda$). Each RE in an RE cluster is associated with a radio antenna providing network coverage to a given cell area.

A plurality of M RECs 30 is connected to the second plurality of N local Add/Drop ports 110 of the node 100. Each of the local Add/Drop ports in the second plurality 110 is connected to an REC via a pair of unidirectional fibres 144, each fibre hosting a single wavelength ($\lambda$). The number M of RECs may be less than the number N of RE clusters and of local Add/Drop ports in each of the first and second pluralities 108, 110. Each REC may thus be connected to a number of local Add/Drop ports in the second plurality 110 that is equal to the number of RE clusters divided by the number of RECs. Each REC may thus serve a number of wavelengths $\lambda$ equal to N/M, with the total number of wavelengths $\lambda$ served by the plurality 30 of RECs being (N/M)*M=N. This is consistent with the N wavelengths coming from the plurality of N RE clusters 20. Local connectivity among REs and RECs is thus strictly non blocking. In a typical scenario, the number N may be 24 and the number M may be 4. 24 RE clusters may thus be connected to 24 ports in the first plurality of local Add/Drop ports 108. The local baseband processing for these clusters is shared between the 4 RECs, each of which is connected to 6 of the local Add/Drop ports in the second plurality 110 of local Add/Drop ports, via 6 pairs of unidirectional fibres. Local communication between the RECs of the plurality of RECs 30 may be enabled via an Ethernet switch 140. Alternatively, an internal fibre link within the node 100 may enable local REC-REC communication, as discussed in further detail below.

Each of the line ports 104, 106 of the node 100 is connected to an optical infrastructure 40. In the illustrated example, the optical infrastructure 40 comprises a pair of unidirectional fibre rings 42, 44. Each line port 104, 106 comprises a line port input 104a, 106a and a line port output 104b, 106b. The node 100 comprises a Wavelength Selective Switch (WSS) 112 coupled between the first and second line ports 104, 106 and configured to drop optical signals from a WDM signal traversing the optical node between the first and second line ports. In the illustrated example, an input 112a of the WSS 112 is connected to the line port input 104a of the East line port 104. A remote connectivity output 112b of the WSS 112 is connected to the line port output 106b of the West line port 106. The node 100 also comprises a node optical combiner 114 coupled between the first and second line ports 104, 106 and configured to add optical signals to a WDM signal traversing the optical node 100 between the first and second line ports 104, 106. In the illustrated example, a remote connectivity input 114a of the node optical combiner 114 is connected to the line port input 106a of the West line port 106. An output 114d of the node optical combiner 114 is connected to the line port output 104b of the East line port 104.

The optical node 100 also comprises first and second switching units 116, 118, each switching unit 116, 118 connected to the WSS 112, the node optical combiner 114, a respective one of the first and second pluralities of local Add/Drop ports 108, 110 and to the other of the first and second switching units 116, 118. Each of the first and second switching units 116, 118 is configured to distribute dropped optical signals from the WSS 112 to its coupled plurality of local Add/Drop ports 108, 110 and to provide optical signals from its coupled plurality of local Add/Drop ports 108, 110 to the node optical combiner 114. Each of the first and second switching units 116, 118 is also configured to distribute optical signals from its coupled plurality of local Add/Drop ports to the other of the first and second switching units 116, 118 and to distribute optical signals from the other of the first and second switching units 116, 118 to its coupled plurality of local Add/Drop ports 108, 110. The first and second switching units 116, 118 thus manage the dispatching of optical signals either locally to the other plurality of local Add/Drop ports 108, 110 or remotely to the optical infrastructure 40 via the first or second line ports 104, 106.

Each of the first and second switching units 116, 118 comprises a receive switching device 120, 122 and a transmit switching device 124, 126. The receive and transmit switching devices 120/122 and 124/126 may comprise Split and Select Switches (SSSs) and are illustrated in greater detail in FIGS. 5 and 6.

Referring particularly to FIG. 5, each receive SSS 120/122 is a 2×N switching device. The features of each receive SSS 120/122 are described below with reference to the receive SSS 120 of the first switching unit 116. However it will be appreciated that corresponding features and connectivity may be found in the receive SSS 122 of the second switching unit 118. The receive SSS 120 comprises a local connectivity WDM signal input 150 which is coupled to a local connectivity output 166 of the transmit SSS 126 of the second switching unit 118. The receive SSS 120 also comprises a remote connectivity WDM signal input 152 which is coupled to a first local connectivity output 112c of the WSS 112. The receive SSS 120 also comprises a plurality of optical signal outputs 154, each optical signal output coupled to a drop output 108a of a respective one of the first plurality of local Add/Drop ports 108 to which the first switching unit 116 is coupled.

The receive SSS 120 also comprises two 1× N optical splitters 156, 158. A local connectivity optical splitter 156 is arranged to receive a WDM signal from the local connectivity WDM signal input 150 of the receive SSS 120. A remote connectivity optical splitter 158 is arranged to receive a WDM signal from the remote connectivity WDM signal input 152 of the receive SSS. The receive SSS 120 also comprises a plurality of N 2×1 optical switches 160. Each of the optical splitters 156, 158 is configured to duplicate its incoming WDM signal into N replicas and send a replica signal to an input 160a of each of the plurality of optical switches 160. Each optical switch 160 is configured to determine which of the two WDM signals it receives, one from the local connectivity input 150 via the local connectivity optical splitter 156 and one from the remote connectivity input 152 via the remote connectivity optical splitter 158, should be selected for transmission from an output 160b of the switch.

The receive SSS 120 also comprises a plurality of N optical tunable filters 162, each optical tunable filter 162 connected between an output 160b of a respective optical switch 160 and a respective optical signal output 154 of the receive SSS 120. Each optical tunable filter 162 receives a WDM signal selected by its respective optical switch 160 and is configured to extract a wavelength from the transmitted WDM signal corresponding to the optical signal output 154 of the receive SSS 120 to which it is coupled. In some examples, each optical switch 160 may be configured to select which of the received duplicate WDM signals to transmit to its connected optical tunable filter 162 on the basis of a control signal received by the optical switch 160. Similarly, each optical tunable filter 162 may be configured to extract a wavelength from the transmitted WDM signal on the basis of a control signal received by the optical tunable filter.

As discussed above, the receive SSS 122 of the second switching unit 118 comprises equivalent internal architecture and connectivity to that of the receive SSS 120 of the first switching unit. Thus, the local connectivity WDM signal input 150 of the receive SSS 122 is coupled to a local connectivity output 166 of the transmit SSS 124 of the first switching unit 116. The remote connectivity WDM signal input 152 of the receive SSS 122 is coupled to a second local connectivity output 112d of the WSS 112. Each optical signal output of the plurality of optical signal outputs 154 of the receive SSS 122 is coupled to a drop output 110a of a respective one of the second plurality of local Add/Drop ports 110 to which the second switching unit 118 is coupled.

Referring now to FIG. 6, each transmit SSS 124/126 is an N×2 switching device. The features of each transmit SSS 124/126 are described below with reference to the transmit SSS 124 of the first switching unit 116. However it will be appreciated that corresponding features and connectivity may be found in the transmit SSS 126 of the second switching unit 118. The transmit SSS 124 comprises a plurality of N optical signal inputs 164, each optical signal input 164 coupled to an add input 108b of a respective one of the plurality of local Add/Drop ports 108 to which the first switching unit 116 is coupled. The transmit SSS 124 also comprises a local connectivity WDM signal output 166, coupled to the local connectivity WDM signal input 150 of the receive SSS 122 of the second switching unit, and a remote connectivity WDM signal output 168, coupled to a first local connectivity input 114b of the node optical combiner 114.

The transmit SSS 124 also comprises two N×1 optical combiners 170, 172. A local connectivity optical combiner 170 is arranged to deliver a WDM signal to the local connectivity WDM signal output 166 of the transmit SSS 124. A remote connectivity optical combiner 172 is arranged to deliver a WDM signal to the remote connectivity WDM signal output 168 of the transmit SSS 124. The transmit SSS 124 also comprises a plurality of N 1×2 optical switches 174, each optical switch arranged to receive an optical signal at its input 174a from a respective one of the optical signal inputs 164 of the transmit SSS and to transmit an optical signal received from its respective optical signal input 164 to at least one of the local connectivity 170 or remote connectivity 172 optical combiners via its outputs 174b. Each of the plurality of optical switches may be configured to select an optical combiner to transmit its received optical signal to on the basis of a received control signal.

The local connectivity optical combiner 170 is configured to multiplex optical signals received from the plurality of optical switches 174 into a WDM signal and to deliver the WDM signal to the local connectivity WDM signal output 166 of the transmit switching device. This is then transmitted to the local connectivity WDM signal input 150 of the receive SSS 122 of the second switching unit 118. The remote connectivity optical combiner 172 is configured to multiplex optical signals received from the plurality of optical switches 174 into a WDM signal and to deliver the WDM signal to the remote connectivity WDM signal output 168 of the transmit switching device. This is then transmitted to the first local connectivity input 114*b* of the node optical combiner 114.

As discussed above, the transmit SSS 126 of the second switching unit 118 comprises equivalent internal architecture and connectivity to that of the transmit SSS 122 of the first switching unit. Thus, each optical signal input 164 of the plurality of N optical signal inputs 164 is coupled to an add input 110*b* of a respective one of the second plurality of local Add/Drop ports 110 to which the second switching unit 118 is coupled. The local connectivity WDM signal output 166 of the transmit SSS 126 is coupled to the local connectivity WDM signal input 150 of the receive SSS 120 of the first switching unit 116, and the remote connectivity WDM signal output 168 of the transmit SSS 126 is coupled to a second local connectivity input 114*c* of the node optical combiner 114.

The transmit SSS 126 of the second switching unit 118 may further comprise an internal switching unit output 176 which may be coupled to an internal switching unit input 178 on the receive SSS 122 of the second switching unit 118. An amplifier OA3 180 may be coupled between the internal switching unit output 176 and internal switching unit input 178. This optical fibre link between the receive and transmit SSSs 122, 126 of the second switching unit 118 may be used for local REC-REC communication between the plurality of RECs 30 connected to the second plurality of local add drop ports 110. This internal switching unit link may replace the Ethernet switch 140 in providing local REC-REC communication.

Referring again to FIG. 4, the optical node 100 further comprises two amplification stages: a local connectivity amplification stage 128, coupled between the first and second switching units 116, 118, and a remote connectivity amplification stage 134, coupled between the first and second line ports 104, 106. The local connectivity amplification stage 128 comprises a first local connectivity amplifier OA2 132, arranged to amplify a WDM signal from the local connectivity WDM signal output 166 of the transmit switching device 124 of the first switching unit 116, and a second local connectivity amplifier OA1 130 arranged to amplify a WDM signal from the local connectivity WDM signal output 166 of the transmit switching device 126 of the second switching unit 118. The remote connectivity amplification stage 134 comprises a first remote connectivity amplifier OA4 136, arranged to amplify a WDM signal for input to the WSS 112, and a second remote connectivity amplifier OA5 138 arranged to amplify a WDM signal from the node optical combiner 114.

The optical node 100 described above supports local add/drop functionality in addition to both internal and external bypass functionality. The WSS 112 facilitates the dropping of optical signals from WDM flows arriving at the optical node 100. These dropped optical flows may be directed to any of the local Add/Drop ports in either the first or second pluralities of local Add/Drop ports 108, 110, via the receive switching devices 120, 122 of the first and second switching units 116, 118. The node optical combiner 114 facilitates the adding of optical signals into WDM flows leaving the optical node 100, via the transmit switching devices 124, 126 of the first and second switching units 116, 118. In addition, the WSS 112 and node optical combiner 114 facilitate external bypass of optical signals neither originating from nor terminating at the optical node 100. Such signals are simply passed across the WSS 112 or node optical combiner 114 from one of the line ports 104, 106 to the other of the line ports 104, 106. The first and second switching units 116, 118 facilitate internal bypass of optical signals between the first and second pluralities of local Add/Drop ports 108, 110. The separate local and remote connectivity amplification stages 128 and 134 enable tailored amplification of optical signals for local and remote connectivity. Thus the local connectivity amplification stage 128 may compensate for losses in the first and second switching units 116, 118 and in connections between them. The first remote connectivity amplifier OA4 136 of the remote connectivity amplification stage 134 may be a pre-amplifier, compensating for losses experienced on incoming traffic from the optical infrastructure 40. The second remote connectivity amplifier OA5 138 of the remote connectivity amplification stage 134 may be a booster amplifier for outgoing traffic towards the optical infrastructure 40.

The optical node 100 may thus act as a local hub for its pluralities of connected RE clusters 20 and RECs 30, so forming a network sub-segment 48. Multiple such sub-segments 48 may cooperate as a network segment 52, joined by an optical infrastructure 40 such as a pair of unidirectional optical fibre rings 42, 44 or an optical fibre mesh. In the case of an optical fibre mesh, additional North and South line ports may be introduced into the optical node 100 for additional connectivity options. The optical node 100 affords the possibility of serving a portion of its connected RE clusters 20 using its connected RECs 30, and the remaining of its RE clusters 20 by RECs connected to other nodes 100, which may be located at large geographical distances and connected via the optical infrastructure 40. The optical node 100 is also able to act as a transparent bypass for traffic which neither originates from nor terminates at the node itself.

Figure 7:
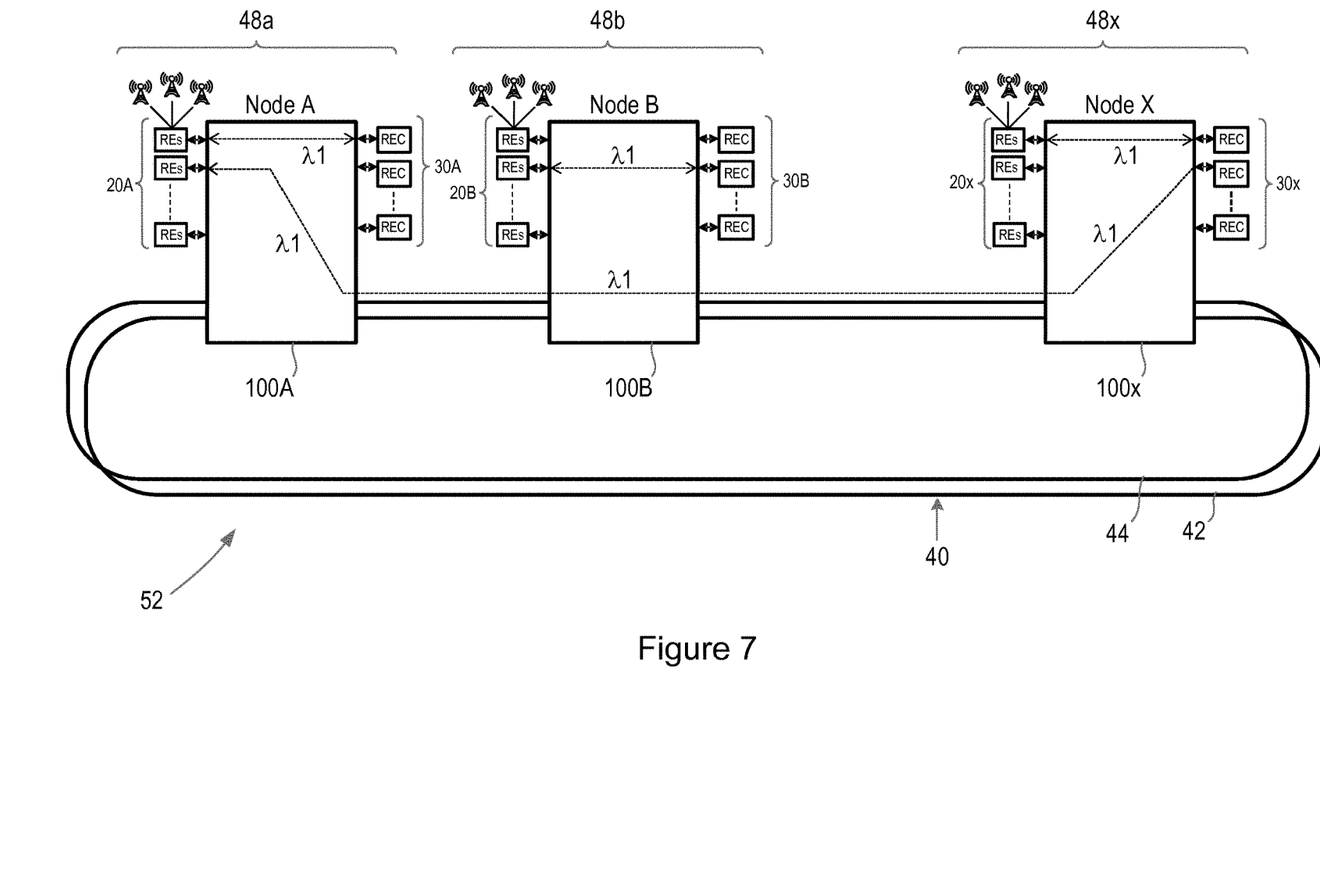
FIG. 7 illustrates another example of network segment.

An advantage afforded by the optical node 100 is that it offers contentionless behaviour between local and remote connectivity. This feature is demonstrated in FIG. 7, which illustrates a network segment 52 comprising three network sub-segments 48A, 48B, 48X, each network sub-segment 48A, 48B, 48X comprising an optical node 100A, 100B, 100X, which acts as a local hub between the RE clusters 20A, 20B, 20X and RECs 30A, 30B, 30X of the sub-segment 48A, 48B, 48X. If, for example, optical node 100A seeks to have baseband processing for one or more of its RE clusters 20A performed by an REC 30X connected to optical node 100X, an optical channel tuned at $\lambda_1$ may be used to connect node 100A with node 100X. The same wavelength $\lambda_1$ may simultaneously be used for local connectivity in all optical nodes 100 in the network segment 52, including node 100A and node 100X. This is thanks to the separate WDM signals for local and remote connectivity formed by the optical combiners of the transmit switching devices 124, 126 of the first and second switching units 116, 118. As a result of this contentionless behaviour, two optical nodes 100 which need to communicate do not need to verify that their chosen transmission wavelength is not already in use for local communication inside any of the nodes on the network segment.

Figure 8:
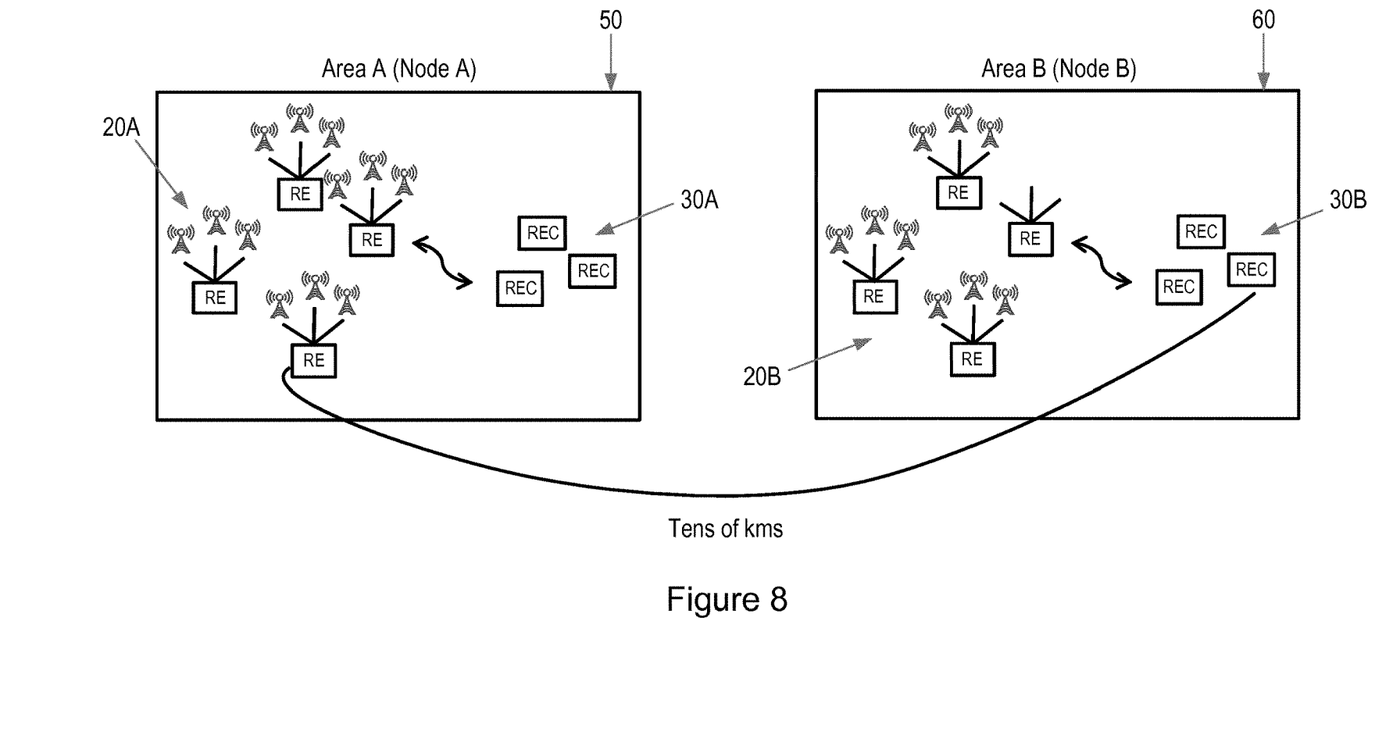
FIG. 8 illustrates a geographic relation between network sub-segments.

FIG. 8 illustrates the flexibility afforded by the optical node in facilitating both local and remote baseband processing. FIG. 8 illustrates area A 50, served by optical node 100A, and area B 60, served by optical node 100B. Each optical node 100A, 100B acts as a local optical hub, enabling local baseband processing of traffic originating with its connected RE clusters 20A, 20B by its local RECs 30A, 30B.

Additionally, each node 100A, 100B facilitates remote baseband processing of traffic originating with its connected RE clusters 20A, 20B in remote RECs 30B, 30A located in the other area 60, 50. The areas 50 and 60 served by the optical nodes 100A, 200A may be separated by many tens of kilometers. Thanks to the contentionless behaviour and dedicated amplification stages, remote connectivity traffic may be amplified by suitable chosen pre and booster amplifiers to enable transport of baseband processing traffic over many tens of kilometers, much larger distances than can be supported with currently known architectures using known optical nodes and OEO conversion.

Figure 9A:
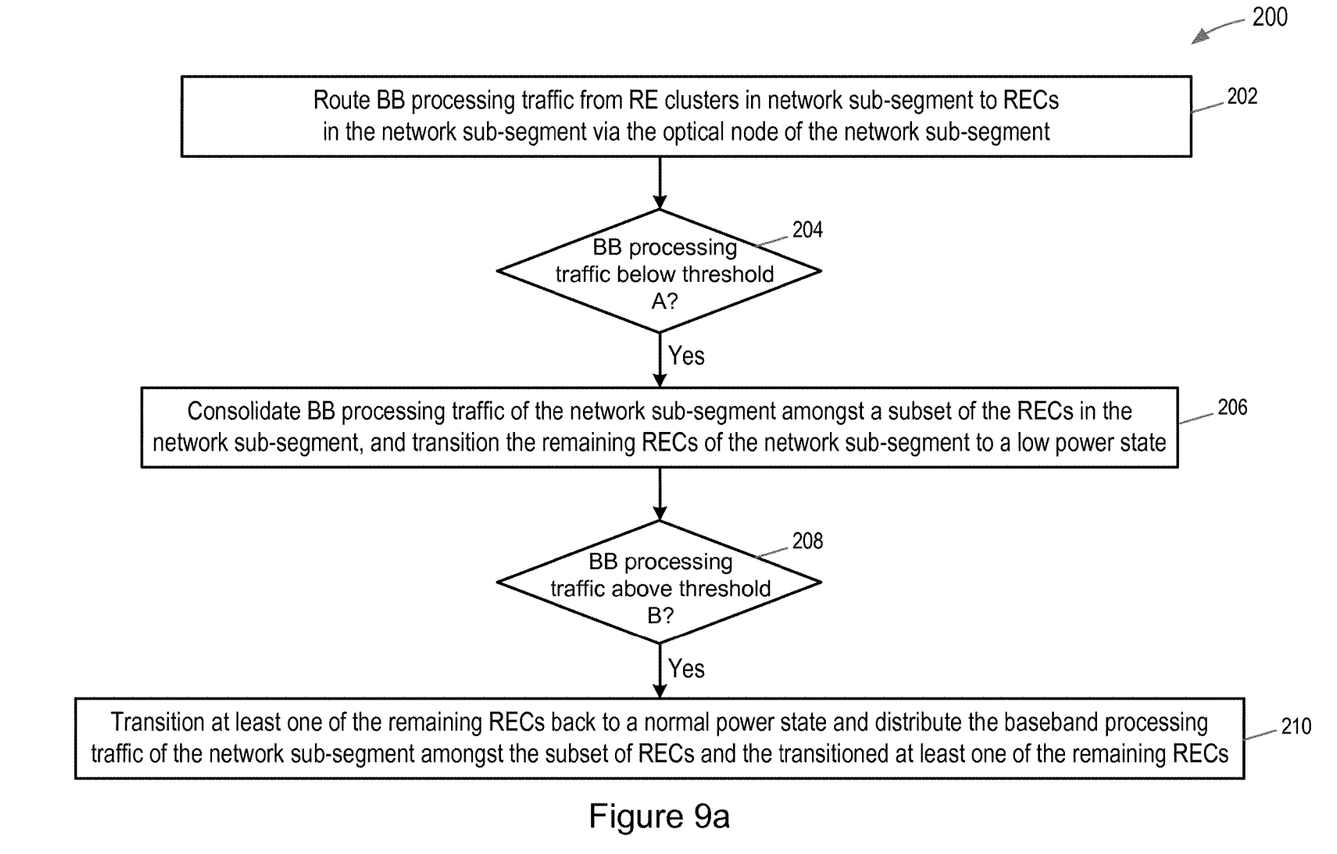
FIGS. 9a and 9b are flow charts illustrating process steps in a method for managing a network segment.

FIG. 9a illustrates steps in a method 200 for managing a network segment 52, which may be a fronthaul network segment of a cellular communication network. The method 200 may be conducted for example at each of the optical nodes 100 of the network segment 52. Referring to FIG. 9a, in a first step 202, the optical node 100 routes baseband processing traffic from RE clusters in its network sub-segment to RECs in its network sub-segment via itself, the optical node of the network sub-segment. In step 204, the optical node checks whether the baseband processing traffic in its sub-segment is below a first threshold level A. If the baseband processing traffic is below the first threshold level A, the optical node 100 consolidates the baseband processing traffic of its network sub-segment amongst a subset of the RECs in its network sub-segment, and transitions the remaining RECs of its network sub-segment to a low power state in step 206. The optical node 100 then checks, at step 208, whether the baseband processing traffic in its network sub-segment is above a second threshold level B. If the baseband processing traffic in its network sub-segment is above the second threshold level B, the optical node 100 transitions at least one of the remaining RECs of its network sub-segment back to a normal power state, and distributes the baseband processing traffic of its network sub-segment amongst the subset of RECs and newly re-awaked REC or RECs at step 210. The first and second threshold levels may be different in order to avoid hysteresis in the method.

The optical node 100 may detect baseband processing traffic above or below the first and second thresholds A and B by monitoring traffic in the node itself or within its network segment. The optical node 100 may also monitor the processing load of its RECs within its network sub-segment. Additionally the network node may monitor traffic trends within the network. For example, traffic may be consolidated amongst a subset of RECs during the night or at other times of low traffic, so saving energy. Sleeping RECs may be reawakened during peak traffic hours, such that the increased processing load may then be shared between all RECs in the sub-segment.

Figure 9B:
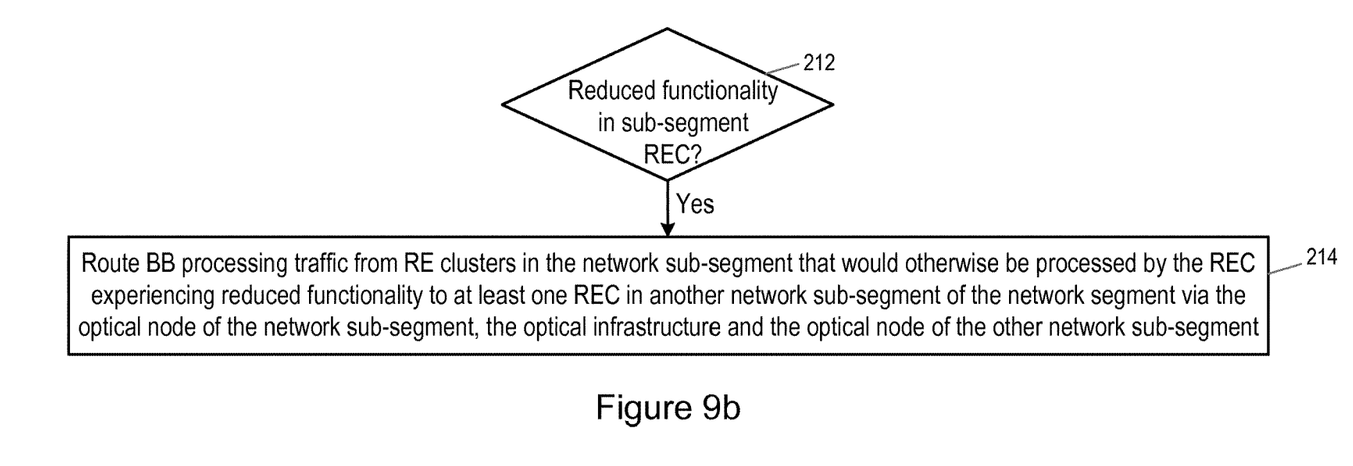

FIG. 9b illustrates additional method steps which may be performed in the method 200, for example running in parallel with the steps 202 to 210 discussed above. Referring to FIG. 9b, the method 200 may further comprise, at step 212, detecting that at least one of the RECs in the network sub-segment is or will shortly be experiencing reduced functionality. This may for example be caused by a malfunction or fault within the REC, or may be caused by an interruption in REC functioning to allow maintenance, upgrade or replacement of the REC or components thereof. On detecting such reduced functionality, the optical node 100, at step 214, routes baseband processing traffic from RE clusters in its network sub-segment, which would otherwise be processed by the REC experiencing reduced functionality, to at least one REC in another network sub-segment of the network segment. The baseband processing traffic is routed via the optical node of the network sub-segment, the optical infrastructure and the optical node of the other network sub-segment. In still further examples, of the method 100, at times of extremely high processing load in the network sub-segment, processing traffic form RE clusters in the network sub-segment may be routed to RECs in another network sub-segment, enabling load balancing across sub-segments.

Figure 10:
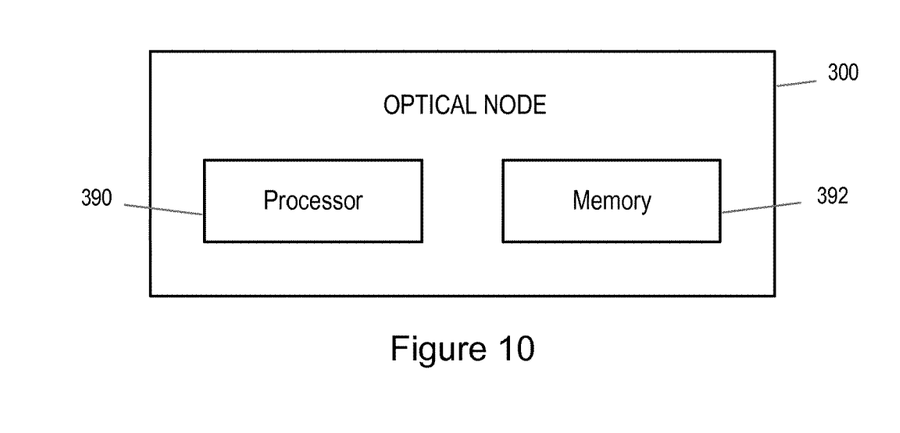
FIG. 10 is a block diagram illustrating functional units in another example of optical node.

FIG. 10 illustrates an alternative example of optical node 300, which may implement the method 200 for example on receipt of suitable instructions from a computer program. Referring to FIG. 10, the optical node 300 comprises a processor 390 and a memory 392. The memory 392 contains instructions executable by the processor 390 such that the optical node 300 is operative to conduct the steps of the method 200.

Aspects of the present invention thus provide an optical node enabling connection between pools of RE clusters and pools of RECs distributed on an optical infrastructure. Optical nodes according to examples of the present invention enable add/drop functionality, internal bypass and external bypass, so facilitating both local connectivity and remote connectivity. Local connectivity is fully non-blocking, and local and remote connectivity are achieved without wavelength contention, so affording flexibility in wavelength assignment and provisioning. Extended geographic reach of the remote connectivity may be achieved by appropriate use of amplification stages. The optical node requires no optical to electric conversion and is transparent to both bitrates and protocols, ensuring future evolution towards new transport protocols, bit rates and modulation formats may be easily accommodated. A framing technique may be used to enable the transport of CPRI signals over optical networks.

Optical nodes according to examples of the present invention are particularly suited to application in a fronthaul network segment, connecting pools of REs with pools of RECs over large geographical areas. In additional to local amplification to compensate for internal node losses, tailored remote connectivity amplification may be used to enlarge the geographic coverage area of a network segment featuring nodes according to examples of the present invention. In this manner, genuine cloud handling of baseband processing traffic may be achieved. Optical nodes according to examples of the invention may support at least the full backup of a pool of RE clusters from a local pool of RECs to a remote pool of RECs.

The method of the present invention may be implemented in hardware, or as software modules running on one or more processors. The method may also be carried out according to the instructions of a computer program, and the present invention also provides a computer readable medium having stored thereon a program for carrying out any of the method steps described herein. A computer program embodying the invention may be stored on a computer readable medium, or it could, for example, be in the form of a signal such as a downloadable data signal provided from an Internet website, or it could be in any other form.

It should be noted that the above-mentioned examples illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality, and a single processor or other unit may fulfil the functions of several units recited in the claims. Any reference signs in the claims shall not be construed so as to limit their scope.

The invention claimed is:

1. An optical node, comprising:
    first and second line ports for Wavelength Division Multiplexing (WDM) signals;
    first and second pluralities of local add/drop ports for optical signals;
    a wavelength selective switch coupled between the first and second line ports and configured to drop optical signals from a WDM signal traversing the optical node between the first and second line ports;
    a node optical combiner coupled between the first and second line ports and configured to add optical signals to a WDM signal traversing the optical node between the first and second line ports; and
    first and second switching units, each switching unit of the first and second switching units coupled to the wavelength selective switch, the node optical combiner, a respective one of the first and second pluralities of local add/drop ports, and the other of the first and second switching units,
    wherein each of the first and second switching units is configured to distribute the dropped optical signals from the wavelength selective switch to its coupled plurality of local add/drop ports and to provide optical signals from its coupled plurality of local add/drop ports to the node optical combiner,
    wherein each of the first and second switching units is also configured to distribute optical signals from its coupled plurality of local add/drop ports to the other of the first and second switching units and to distribute optical signals from the other of the first and second switching units to its coupled plurality of local add/drop ports,
    wherein each of the first and second switching units comprises a receive switching device and a transmit switching device, and wherein the receive switching device of each switching unit comprises:
        a local connectivity WDM signal input coupled to an output of the transmit switching device of the other switching unit;
        a remote connectivity WDM signal input coupled to an output of the wavelength selective switch;
        a plurality of optical signal outputs, each of the plurality of optical signal outputs coupled to a drop output of a respective one of the first and second pluralities of local add/drop ports to which the switching unit of the receive switching device is coupled;
        a local connectivity splitter, arranged to receive a WDM signal from the local connectivity WDM signal input of the receive switching device;
        a remote connectivity splitter, arranged to receive a WDM signal from the remote connectivity WDM signal input of the receive switching device;
        a plurality of optical switches; and
        a plurality of optical tunable filters, each optical tunable filter coupled between an output of a respective optical switch and a respective one of the plurality of optical signal outputs of the receive switching device,
    wherein each of the local connectivity splitter and the remote connectivity splitter is configured to duplicate its received WDM signal and to send a duplicate of the received WDM signal to an input of each of the plurality of optical switches,
    wherein each of the plurality of optical switches is configured to select which of the received duplicate WDM signals to transmit, and
    wherein each of the tunable optical filters is configured to extract a wavelength from the transmitted WDM signal corresponding to the optical signal output of the receive switching device to which it is coupled.

2. The optical node as claimed in claim 1, wherein the first plurality of local add/drop ports is equal in number to the second plurality of local add/drop ports.

3. The optical node as claimed in claim 1, wherein each local add/drop port in the first and second pluralities of local add/drop ports is operable for connection to a pair of unidirectional optical fibers, each fiber hosting a single wavelength.

4. The optical node as claimed in claim 1, wherein the receive and transmit switching devices of each switching unit comprise split and select switches.

5. The optical node as claimed in claim 1, wherein each of the plurality of optical switches is configured to select which of the received duplicate WDM signals to transmit on the basis of a received control signal.

6. The optical node as claimed in claim 1, wherein each of the tunable optical filters is configured to extract the wavelength from the transmitted WDM signal corresponding to the optical signal output of the receive switching device to which it is coupled on the basis of a received control signal.

7. The optical node as claimed in claim 1, wherein the transmit switching device of each switching unit comprises:
    a plurality of optical signal inputs, each optical signal input coupled to an add input of a respective one of the first and second pluralities of local add/drop ports to which the switching unit of the transmit switching device is coupled;
    a local connectivity WDM signal output coupled to an input of the receive switching device of the other switching unit; and
    a remote connectivity WDM signal output coupled to an input of the node optical combiner.

8. The optical node as claimed in claim 7, wherein the transmit switching device of each switching unit further comprises:
    a local connectivity optical combiner, arranged to deliver a WDM signal to the local connectivity WDM signal output of the transmit switching device;
    a remote connectivity optical combiner, arranged to deliver a WDM signal to the remote connectivity WDM signal output of the transmit switching device; and
    a plurality of optical switches, each optical switch arranged to receive an optical signal from a respective one of the plurality of optical signal inputs of the transmit switching device,
    wherein each of the plurality of optical switches is configured to transmit the optical signal received from its respective optical signal input to at least one of the local connectivity or remote connectivity optical combiners,
    wherein the local connectivity optical combiner is configured to multiplex optical signals received from the plurality of optical switches into a WDM signal and to deliver the WDM signal to the local connectivity WDM signal output of the transmit switching device, and wherein the remote connectivity optical combiner is configured to multiplex optical signals received from the plurality of optical switches into a WDM signal and to deliver the WDM signal to the remote connectivity WDM signal output of the transmit switching device.

9. The optical node as claimed in claim 8, wherein each of the plurality of optical switches is configured to select an optical combiner to transmit its received optical signal on the basis of a received control signal.

10. The optical node as claimed in claim 7, wherein the transmit switching device of at least one of the first or second switching units further comprises an internal switching unit output, coupled to an internal switching unit input of the receive switching device of the at least one of the first or second switching units.

11. The optical node as claimed in claim 1, further comprising:
   a local connectivity amplification stage coupled between the first and second switching units; and
   a remote connectivity amplification stage coupled between the first and second line ports.

12. The optical node as claimed in claim 11,
wherein the local connectivity amplification stage comprises:
   a first local connectivity amplifier arranged to amplify a WDM signal from the local connectivity WDM signal output of the transmit switching device of the first switching unit; and
   a second local connectivity amplifier arranged to amplify a WDM signal from the local connectivity WDM signal output of the transmit switching device of the second switching unit.

13. The optical node as claimed in claim 11, wherein the remote connectivity amplification stage comprises:
   a first remote connectivity amplifier arranged to amplify a WDM signal for input to the wavelength selective switch; and
   a second remote connectivity amplifier arranged to amplify a WDM signal from the node optical combiner.

14. A network sub-segment comprising:
   the optical node as claimed in claim 1;
   a plurality of Radio Equipment (RE) clusters, each RE cluster connected to a local add/drop port of the first plurality of local add/drop ports of the optical node; and
   a plurality of Radio Equipment Controllers (RECs), the plurality of RECs connected to the second plurality of local add/drop ports of the optical node.

15. The network sub-segment as claimed in claim 14, wherein each RE cluster is connected to its respective local add/drop port on the optical node by a pair of unidirectional optical fibers.

16. The network sub-segment as claimed in claim 14, wherein each REC is connected to a number of local add/drop ports in the second plurality of local add/drop ports that corresponds to the number of RE clusters divided by the number of RECs.

17. The network sub-segment as claimed in claim 14, wherein each local add/drop port of the second plurality of local add/drop ports on the optical node is connected to an REC by a pair of unidirectional optical fibers.

18. A network segment, comprising:
   a plurality of network sub-segments as claimed in claim 14; and
   an optical infrastructure,
   wherein the optical infrastructure is coupled to the first and second line ports of the optical nodes of the plurality of network sub-segments.

19. The network segment as claimed in claim 18, wherein the optical infrastructure comprises a pair of unidirectional optical fiber rings, each network sub-segment being mounted on each ring via a line input and a line output at each of the first and second line ports on its optical node.

20. The network segment as claimed in claim 18, wherein the optical node of each network sub-segment further comprises third and fourth line ports for WDM signals, and
   wherein the optical infrastructure comprises an optical fiber mesh, each network sub-segment being connected to the optical fiber mesh via a line input and a line output at each of the first, second, third and fourth line ports on its optical node.

21. The network segment as claimed in claim 18, wherein the network segment comprises a fronthaul network segment for a Radio Access Network (RAN) of a cellular communications network.

* * * * *